US012759646B2

(12) United States Patent
Ito et al.

(10) Patent No.: US 12,759,646 B2
(45) Date of Patent: Oct. 13, 2026

(54) VEHICLE BODY FLOOR STRUCTURE

(71) Applicant: SUBARU CORPORATION, Tokyo (JP)

(72) Inventors: Hiroyasu Ito, Tokyo (JP); Yuya Mukainakano, Tokyo (JP); Masaharu Noguchi, Tokyo (JP); Shohei Kanemitsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 185 days.

(21) Appl. No.: 18/964,914

(22) Filed: Dec. 2, 2024

(65) Prior Publication Data

US 2025/0091664 A1 Mar. 20, 2025

Related U.S. Application Data

(63) Continuation of application No. PCT/JP2023/012778, filed on Mar. 29, 2023.

(51) Int. Cl.
*B62D 25/20* (2006.01)
*B62D 27/06* (2006.01)
*B62D 29/04* (2006.01)

(52) U.S. Cl.
CPC ........... *B62D 29/043* (2013.01); *B62D 25/20* (2013.01); *B62D 27/065* (2013.01)

(58) Field of Classification Search
CPC .... B62D 29/043; B62D 25/20; B62D 27/065; B62D 25/2009; B62D 25/2036; B62D 25/025

(Continued)

(56) References Cited

U.S. PATENT DOCUMENTS 9,499,203 B1 * 11/2016 Finley .................. B62D 29/043

FOREIGN PATENT DOCUMENTS

JP 4-135720 * 5/1992 ............. B29C 45/14
JP 4-135720 A 5/1992

(Continued)

OTHER PUBLICATIONS

International Search Report (with English translation) and Written Opinion dated May 23, 2023, from corresponding International Application No. PCT/JP2023/012778, 9 pages.

*Primary Examiner* — Amy R Weisberg
*Assistant Examiner* — Daniel R Digiovannantonio
(74) *Attorney, Agent, or Firm* — Rimon P.C.

(57) ABSTRACT

A vehicle body floor structure includes a panel base member made of a fiber-reinforced resin composite material, and continuous fiber-reinforced resin bands. Each of the resin bands is provided with coupling portions at ends and include a continuous fiber sewn onto the panel base member. The coupling portions are individually coupled to other structural members of the panel base member. The resin bands include at least one longitudinal band disposed along a vehicle longitudinal direction, at least one widthwise band disposed along a vehicle width direction, and at least one inclined band disposed in a direction partially or entirely intersecting the vehicle longitudinal direction and the vehicle width direction. The inclined band includes a part disposed along the vehicle longitudinal direction or the vehicle width direction, and another part bent from the first part and disposed in a direction intersecting the vehicle longitudinal direction and the vehicle width direction.

3 Claims, 5 Drawing Sheets

(58) Field of Classification Search
USPC .............................................. 296/193.07, 209
See application file for complete search history.

(56) References Cited

FOREIGN PATENT DOCUMENTS

| | | | | | |
|---|---|---|---|---|---|
| JP | 2017-61170 | A | * | 3/2017 | ............. B62D 25/20 |
| JP | 2017-165173 | A | * | 9/2017 | ............. B62D 25/20 |

* cited by examiner

VEHICLE BODY FLOOR STRUCTURE

CROSS REFERENCE TO RELATED APPLICATIONS

This application is continuation of International Application No. PCT/JP2023/012778, filed on Mar. 29, 2023, the entire contents of which are hereby incorporated by reference.

BACKGROUND

The technology of the disclosure relates to a vehicle body floor structure of an automobile using a fiber-reinforced resin composite material.

In recent years, for the purpose of reducing weight of vehicle bodies of automobiles such as passenger cars, progress has been made in manufacturing structural members for the vehicle bodies using fiber-reinforced resins, such as carbon fiber-reinforced plastics (hereinafter referred to as CFRP). The structural members made of the fiber-reinforced resins have high rigidity and exhibit high strength, for example, against compressive stress or tensile stress acting in a direction of a fiber orientation. For example, Japanese Unexamined Patent Application Publication (JP-A) No. 2017-165173 discloses a vehicle panel structure in which part of a floor of a vehicle body is formed using reinforcing fibers. For example, the vehicle panel structure described in JP-A No. 2017-165173 has a configuration in which a panel made of a fiber-reinforced resin is fixed to a floor tunnel, a cross member, and a panel support formed of a steel plate.

SUMMARY

An aspect of the disclosure provides a vehicle body floor structure made of a fiber-reinforced resin composite material. The vehicle body floor structure includes a panel base member made of a fiber-reinforced resin composite material, and continuous fiber-reinforced resin bands. Each of the continuous fiber-reinforced resin bands is provided with a first coupling portion and a second coupling portion at respective ends and include a continuous fiber sewn onto the panel base member. The first coupling portion and the second coupling portion are individually coupled to other structural members of the panel base member. The continuous fiber-reinforced resin bands include at least one longitudinal band disposed along a vehicle longitudinal direction, at least one widthwise band disposed along a vehicle width direction, and at least one inclined band disposed in a direction partially or entirely intersecting the vehicle longitudinal direction and the vehicle width direction. The at least one inclined band includes a first part disposed along the vehicle longitudinal direction or the vehicle width direction, and a second part bent from the first part and disposed in a direction intersecting the vehicle longitudinal direction and the vehicle width direction.

BRIEF DESCRIPTION OF THE DRAWINGS

The accompanying drawings are included to provide a further understanding of the disclosure, and are incorporated in and constitute a part of this specification. The drawings illustrate an embodiment and, together with the specification, serve to explain the principles of the disclosure.

DETAILED DESCRIPTION

The vehicle panel structure described in JP-A No. 2017-165173 uses the fiber-reinforced resin only for the floor panel. Thus, the weight can be further reduced. On the other hand, the floor of the vehicle body is joined to other structural members, such as a toe board and side sills, and is intended to be strong or rigid enough to withstand loads input during any type of collision, such as a frontal collision, a rear collision, or a side collision, or during a rollover. For example, design of load transmission paths is used to disperse the input loads and reduce deformation of the vehicle body.

Thus, the technology of the disclosure has been developed in view of the above problems. It is desirable to improve a load bearing capacity and ensure load transmission paths when forming a vehicle body floor structure using a fiber-reinforced resin composite material. In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Outline of Vehicle Body Structure

First, an outline of a vehicle body structure including a vehicle body floor structure according to the embodiment will be described.

Figure 1:
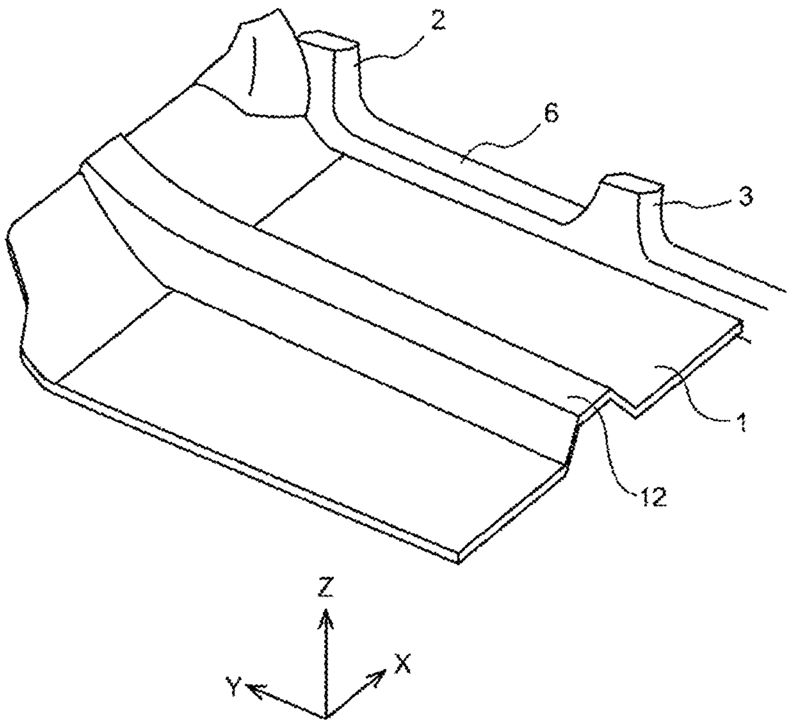
FIG. 1 is a perspective view schematically illustrating part of a vehicle body structure including a vehicle body floor structure according to an embodiment.

FIG. 1 is a perspective view schematically illustrating part of the vehicle body structure including the vehicle body floor structure. FIG. 1 is a schematic view of the vehicle body structure as seen from a rear left to a front right. Note that as illustrated in FIG. 1, in this specification, a vehicle width direction may be referred to as an X direction, a vehicle longitudinal direction may be referred to as a Y direction, and a vehicle body height direction may be referred to as a Z direction.

The vehicle body structure illustrated in FIG. 1 includes a floor member 1, a front pillar 2, a center pillar 3, a side sill 6, and the like. A lower end of the front pillar 2 is coupled to a front end of the side sill 6, and an upper end thereof is coupled to a front end of a roof pillar (not illustrated). A lower end of the center pillar 3 is coupled to the center of the side sill 6 in the vehicle longitudinal direction, and an upper end thereof is coupled to the center of the roof pillar (not illustrated) in the vehicle longitudinal direction. The roof pillar (not illustrated) extends along the vehicle longitudinal direction above a vehicle interior space, and serves as a side member of a vehicle roof. The side sill 6 extends along the vehicle longitudinal direction at a lower part of the side of the vehicle.

The floor member 1 illustrated in FIG. 1 has a tunnel member 12 formed in the center in the vehicle width direction and extending along the vehicle longitudinal direction. The tunnel member 12 forms a space in which, for example, a propeller shaft is disposed to transmit torque output from an engine or a drive motor mounted on a front side of the vehicle body to rear wheels.

Vehicles that do not have a propeller shaft, such as electric vehicles that have a front-wheel drive motor on the front side of the vehicle body and a rear-wheel drive motor on the rear side of the vehicle body, or electric vehicles that have four drive motors near wheels to drive the wheels, respectively, do not need to have the tunnel member 12 in the floor member 1.

Other than the floor member 1, the front pillar 2, the center pillar 3, the roof pillar, and the side sill 6 may each be a member primarily made of a fiber-reinforced resin. The member primarily made of a fiber-reinforced resin refers to a composite member including a panel that is a fiber-reinforced resin composite member, and may include metal members such as reinforcing members and fastening members.

The fiber-reinforced resin composite member is a member obtained by molding a fiber-reinforced resin containing reinforcing fibers mainly including carbon fibers or aramid fibers, and a matrix resin that is a thermoplastic resin or a thermosetting resin. However, types of the reinforcing fibers are not limited to carbon fibers and aramid fibers. Further, multiple types of fibers may be used as reinforcing fibers.

Examples of the thermoplastic resin include polyethylene resin, polypropylene resin, polyvinyl chloride resin, acrylonitrile-butadiene-styrene copolymer synthetic resin (ABS resin), polystyrene resin, acrylonitrile-styrene copolymer synthetic resin (AS resin), polyamide resin, polyacetal resin, polycarbonate resin, polyester resin, polyphenylene sulfide (PPS) resin, fluororesin, polyetherimide resin, polyether ketone resin, and polyimide resin. The matrix resin may be composed of one type or a mixture of two or more types of these thermoplastic resins. Alternatively, the matrix resin may be a copolymer of these thermoplastic resins. When the thermoplastic resin is a mixture, a compatibilizer may be further used in combination. Furthermore, a flame retardant such as a bromine-based flame retardant, a silicon-based flame retardant, or red phosphorus may be added to the thermoplastic resin.

Examples of the thermosetting resin include epoxy resin, unsaturated polyester resin, vinyl ester resin, phenol resin, polyurethane resin, and silicone resin. The matrix resin may be composed of one type or a mixture of two or more types of these thermosetting resins. When these thermosetting resins are used, an appropriate curing agent or reaction accelerator may be added to the thermosetting resin.

The reinforcing fibers may include fibers oriented in an axial direction and fibers oriented in a direction intersecting the axial direction in an appropriate ratio. In addition to continuous fibers extending continuously in predetermined directions, the reinforcing fibers may include short fibers cut to pieces of several millimeters in length.

2. Details of Vehicle Body Floor Structure

The following is a detailed description of the vehicle body floor structure according to the embodiment.

Figure 2:
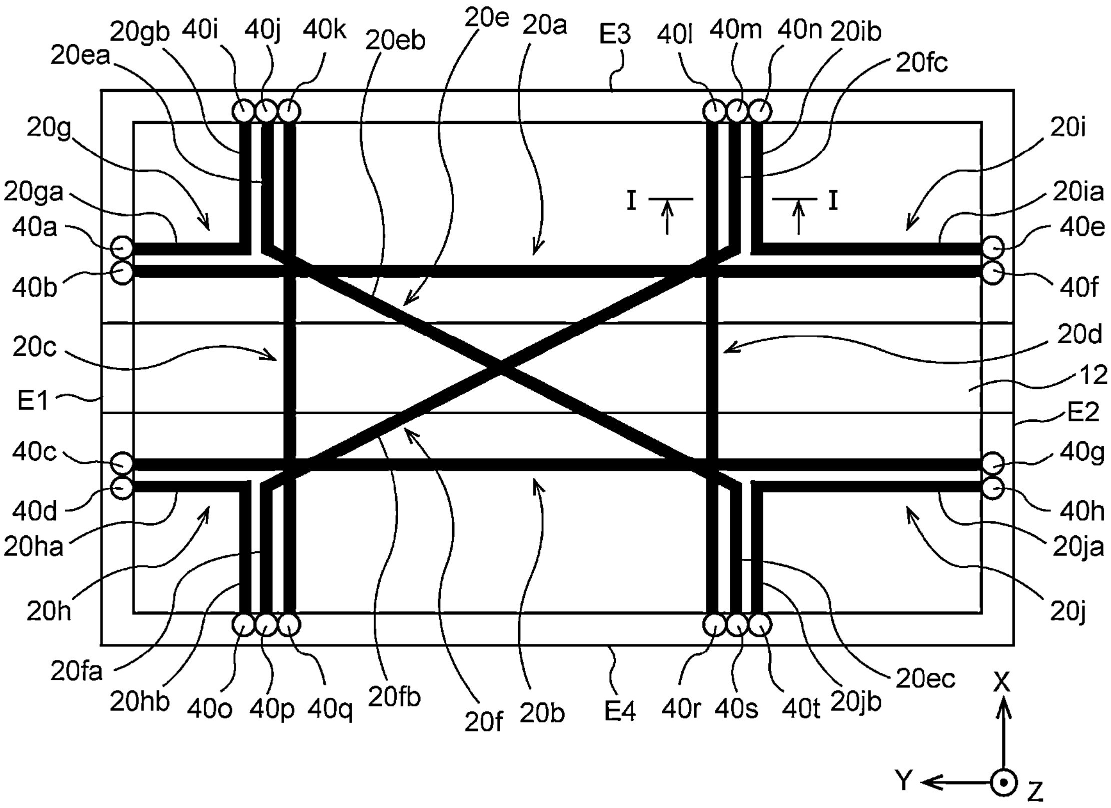
FIG. 2 illustrates the vehicle body floor structure according to the embodiment.

FIG. 2 illustrates the vehicle body floor structure according to the embodiment.

In the vehicle body floor structure according to the embodiment, the floor member 1 includes a panel base member 10 and continuous fiber-reinforced resin bands 20. The continuous fiber-reinforced resin bands 20 are components formed using a tailored fiber placement (TFP) method, and include continuous fibers sewn onto the panel base member 10.

Note that the continuous fiber-reinforced resin bands 20 disposed on the panel base member 10 appear distorted along a shape of the panel base member 10 in three dimensions, but in order to facilitate understanding, FIG. 2 illustrates the continuous fiber-reinforced resin bands 20 in planar shapes without considering uneven shapes due to the tunnel member 12.

The panel base member 10 is a part that determines an overall shape of the floor member 1. Similar to the front pillar 2, the center pillar 3, and other members described above, the panel base member 10 is made of a fiber-reinforced resin composite material containing reinforcing fibers and a matrix resin, and has predetermined rigidity or strength. When the panel base member 10 contains continuous fibers, for example, some of the continuous fibers are oriented in the vehicle width direction or the vehicle longitudinal direction, and remaining fibers are oriented in a direction at plus or minus 45 degrees to the vehicle longitudinal direction or the vehicle width direction. Thus, the panel base member 10 itself can be strong enough to withstand impact loads from any direction. A thickness of the panel base member 10 is not limited as long as desired rigidity is obtained, but may be within a range of 0.2 to 10.0 mm, for example.

The panel base member 10 has winding members 40 on a vehicle body front side, a vehicle body rear side, a vehicle body left side, and a vehicle body right side. The winding member 40 is a member around which the continuous fibers constituting the continuous fiber-reinforced resin band 20 are wound. The winding members 40 serve as both ends of each of the continuous fiber-reinforced resin bands 20. The panel base member 10 of the floor member 1 illustrated in FIG. 2 includes 20 winding members 40.

In one example, two winding members, a first winding member **40*a* and a second winding member 40*b*, are provided on a side E1 of the panel base member 10 on the vehicle body front side, on a right side of the tunnel member 12. Two winding members, a third winding member 40*c* and a fourth winding member 40*d*, are provided on the side E1 of the panel base member 10 on the vehicle body front side, on a left side of the tunnel member 12. Positions at which the first winding member 40*a* and the second winding member 40*b*, and the third winding member 40*c* and the fourth winding member 40*d*, are provided coincide with positions of coupling portions at which the floor member 1** is joined to a toe board (not illustrated).

Similarly, a fifth winding member **40*e* and a sixth winding member 40*f* are provided on a side E2 of the panel base member 10 on the vehicle body rear side, on the right side of the tunnel member 12. A seventh winding member 40*g* and an eighth winding member 40*h* are provided on the side E2 of the panel base member 10 on the vehicle body rear side, on the left side of the tunnel member 12. Positions at which the fifth winding member 40***e* and the sixth winding member 40*f*, and the seventh winding member 40*g* and the eighth winding member 40*h*, are provided coincide with positions of coupling portions at which the floor member 1 is joined to a rear panel (not illustrated).

A ninth winding member 40*i*, a 10th winding member 40*j*, and an 11th winding member 40*k* are provided on a side E3 of the panel base member 10 on the vehicle body right side, on the front side with respect to the center of the side E3. Positions at which the three winding members are provided coincide with positions of coupling portions at which the floor member 1 is joined to the right front pillar 2. A 12th winding member 401, a 13th winding member 40*m*, and a 14th winding member 40*n* are provided on the side E3 of the panel base member 10 on the vehicle body right side, on the rear side with respect to the center of the side E3. Positions at which the three winding members are provided coincide with positions of coupling portions at which the floor member 1 is joined to the right center pillar 3.

A 15th winding member 40*o*, a 16th winding member 40*p*, and a 17th winding member 40*q* are provided on a side E4 of the panel base member 10 on the vehicle body left side, on the front side with respect to the center of the side E4. Positions at which the three winding members are provided coincide with positions of coupling portions at which the floor member 1 is joined to the left front pillar. An 18th winding member 40*r*, a 19th winding member 40*s*, and a 20th winding member 40*t* are provided on the side E4 of the panel base member 10 on the vehicle body left side, on the rear side with respect to the center of the side E4. Positions at which the three winding members are provided coincide with positions of coupling portions at which the floor member 1 is joined to the left center pillar.

Note that when the multiple winding members are not to be distinguished, the multiple winding members are collectively referred to as winding members 40. When the multiple continuous fiber-reinforced resin bands are not to be distinguished, the multiple continuous fiber-reinforced resin bands are collectively referred to as continuous fiber-reinforced resin bands 20.

Figure 3:
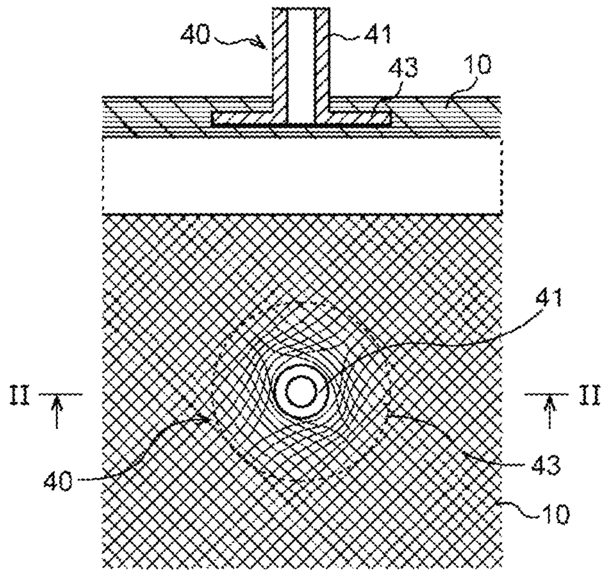
FIG. 3 illustrates an example of a method of fixing a winding member to a panel base member in the vehicle body floor structure according to the embodiment.

FIG. 3 illustrates a plan view of the panel base member 10 with the winding member 40 fixed and a cross-sectional view taken along line II-II. For example, as illustrated in FIG. 3, each of the winding members 40 may be fixed to the panel base member 10 such that part of the winding member 40 is embedded in the continuous fibers contained in the panel base member 10. The winding member 40 illustrated in FIG. 3 includes a main body 41 around which the continuous fibers are wound, and a base 43 having a diameter larger than the main body 41. The base 43 is held down by the fibers constituting the panel base member 10 (in the figure, the fibers oriented in directions intersecting at 90 degrees to each other), thereby fixing the base 43 to the panel base member 10. With such a configuration, the winding member 40 can be firmly attached to the panel base member 10 without cutting the continuous fibers constituting the panel base member 10. However, a method of attaching the winding member 40 to the panel base member 10 is not limited to the above example.

Each of the continuous fiber-reinforced resin bands 20 is a component made of a band-shaped fiber-reinforced resin containing continuous reinforcing fibers sewn onto the panel base member 10. Each of the continuous fiber-reinforced resin bands 20 is disposed such that two of the winding members 40 provided to the panel base member 10 are located at both ends. In one example, each of the continuous fiber-reinforced resin bands 20 includes continuous fibers that are wound around two winding members 40 provided to the panel base member 10 and disposed in such a way as to move back and forth between the two winding members 40 multiple times. These continuous fibers are disposed in such a way as to move back and forth between the two winding members 40 multiple times while being sewn onto predesigned positions of the panel base member 10, and are cured together with the matrix resin.

For example, the continuous fiber-reinforced resin bands 20 may include at least one longitudinal band disposed along the vehicle longitudinal direction, at least one widthwise band disposed along the vehicle width direction, and at least one inclined band disposed in a direction partially or entirely intersecting the vehicle longitudinal direction and the vehicle width direction.

The floor member 1 illustrated in FIG. 2 includes a total of 10 continuous fiber-reinforced resin bands 20. In one example, the continuous fiber-reinforced resin bands 20 include two longitudinal bands 20*a* and 20*b* disposed along the vehicle longitudinal direction, two widthwise bands 20*c* and 20*d* disposed along the vehicle width direction, and two inclined bands 20*e* and 20*f* disposed in a direction partially intersecting the vehicle longitudinal direction and the vehicle width direction.

For example, the continuous fiber-reinforced resin bands 20 include the first longitudinal band 20*a* disposed along the vehicle longitudinal direction on the right side of the tunnel member 12 and the second longitudinal band 20*b* disposed along the vehicle longitudinal direction on the left side of the tunnel member 12. The first longitudinal band 20*a* includes continuous fibers wound around the second winding member 40*b* and the sixth winding member 40*f* and sewn onto the panel base member 10. The second longitudinal band 20*b* includes continuous fibers wound around the third winding member 40*c* and the seventh winding member 40*g* and sewn onto the panel base member 10.

The continuous fiber-reinforced resin bands 20 include the first widthwise band 20*c* disposed along the vehicle width direction on the front side with respect to the center in the vehicle longitudinal direction and the second widthwise band 20*d* disposed along the vehicle width direction on the rear side with respect to the center in the vehicle longitudinal direction. The first widthwise band 20*c* includes continuous fibers wound around the 11th winding member 40*k* and the 17th winding member 40*q* and sewn onto the panel base member 10. The second widthwise band 20*d* includes continuous fibers wound around the 12th winding member 401 and the 18th winding member 40*r* and sewn onto the panel base member 10.

The continuous fiber-reinforced resin bands 20 include the first inclined band 20*e* disposed along the front right to the rear left of the floor member 1, and the second inclined band 20*f* disposed along the front left to the rear right of the floor member 1. The first inclined band 20*e* includes continuous fibers wound around the 10th winding member 40*j* and the 19th winding member 40*s* and sewn onto the panel base member 10. The first inclined band 20*e* includes two first parts 20*ea* and 20*ec* disposed along the vehicle width direction from the 10th winding member 40*j* provided on the side on the vehicle right side, on the front side, and the 19th winding member 40*s* provided on the side on the vehicle left side, on the rear side, and a second part 20*eb* bent from the two first parts and disposed in a direction intersecting the vehicle longitudinal direction and the vehicle width direction. The second inclined band 20*f* includes continuous fibers wound around the 13th winding member 40*m* and the 16th winding member 40*p* and sewn onto the panel base member 10. The second inclined band 20*f* includes two first parts 20*fa* and 20*fc* disposed along the vehicle width direction from the 16th winding member 40*p* provided on the side on the vehicle left side, on the front side, and the 13th winding member 40*m* provided on the side on the vehicle left side, on the rear side, and a second part 20*fb* bent from the two first parts and disposed in a direction intersecting the vehicle longitudinal direction and the vehicle width direction.

Furthermore, the continuous fiber-reinforced resin bands 20 illustrated in FIG. 2 include four orthogonal bands, each of which includes a first part disposed along the vehicle longitudinal direction and a second part bent from the first part and disposed along the vehicle width direction. In one example, the first orthogonal band 20*g* includes continuous fibers wound around the first winding member 40*a* and the ninth winding member 40*i* and sewn onto the panel base member 10. The first orthogonal band 20*g* includes a first part 20*ga* disposed along the vehicle longitudinal direction from the first winding member 40*a* provided on the side E1 on the vehicle front side, on the right side, and a second part 20*gb* bent from the first part and disposed along the vehicle width direction to the ninth winding member 40*i* provided on the side E3 on the vehicle right side, on the front side. The second orthogonal band 20*h* includes continuous fibers wound around the fourth winding member 40*d* and the 15th winding member 40*o* and sewn onto the panel base member 10. The second orthogonal band 20*h* includes a first part 20*ha* disposed along the vehicle longitudinal direction from the fourth winding member 40*d* provided on the side E1 on the vehicle front side, on the left side, and a second part 20*hb* bent from the first part and disposed along the vehicle width direction to the 15th winding member 40*o* provided on the side E4 on the vehicle left side, on the front side.

The third orthogonal band 20*i* includes continuous fibers wound around the fifth winding member 40*e* and the 14th winding member 40*n* and sewn onto the panel base member 10. The third orthogonal band 20*i* includes a first part 20*ia* disposed along the vehicle longitudinal direction from the fifth winding member 40*e* provided on the side E2 on the vehicle rear side, on the right side, and a second part 20*ib* bent from the first part and disposed along the vehicle width direction to the 14th winding member 40*n* provided on the side E3 on the vehicle right side, on the rear side. The fourth orthogonal band 20*j* includes continuous fibers wound around the eighth winding member 40*h* and the 20th winding member 40*t* and sewn onto the panel base member 10. The fourth orthogonal band 20*j* includes a first part 20*ja* disposed along the vehicle longitudinal direction from the eighth winding member 40*h* provided on the side E2 on the vehicle rear side, on the left side, and a second part 20*jb* bent from the first part and disposed along the vehicle width direction to the 20th winding member 40*t* provided on the side E4 on the vehicle left side, on the rear side.

Figure 4:
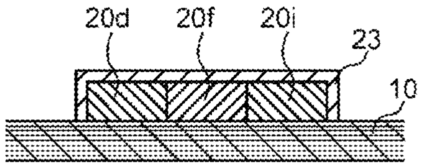
FIG. 4 is a cross-sectional view taken along line I-I in FIG. 2.

FIG. 4 illustrates a cross-sectional view taken along line I-I in FIG. 2. In a position illustrated in FIG. 4, the three bands, namely the second widthwise band 20*d*, the second inclined band 20*f*, and the third orthogonal band 20*i*, are collectively covered with a covering layer 23. The remaining continuous fiber-reinforced resin bands 20 are covered with the covering layer 23 either one by one or several together. The covering layer may be formed using a fiber-reinforced resin, or may be formed using a resin that does not contain reinforcing fibers. Thus, the continuous fibers of the continuous fiber-reinforced resin bands 20 are not exposed on the surface, making it difficult for the continuous fiber-reinforced resin bands 20 to separate from the panel base member 10 when a load is input to the floor member 1, and also preventing the continuous fibers from unraveling.

In the vehicle body floor structure of the embodiment configured as described above, the continuous fiber-reinforced resin bands 20 are provided with any two coupling portions (a first coupling portion and a second coupling portion) at both ends, which are coupled to the toe board, the right and left front pillars, the right and left center pillars, and the rear panel. Therefore, the load input to the vehicle body during a vehicle collision, rollover, or the like can be transmitted to other structural members via the continuous fiber-reinforced resin bands 20, thereby dispersing the collision load.

The continuous fiber-reinforced resin bands 20 include the first longitudinal band 20*a* and the second longitudinal band 20*b* disposed along the vehicle longitudinal direction, the first widthwise band 20*c* and the second widthwise band 20*d* disposed along the vehicle width direction, and the first inclined band 20*e* and the second inclined band 20*f* disposed in directions partially intersecting the vehicle longitudinal direction and the vehicle width direction. Therefore, strength against compressive stress and tensile stress occurring in the vehicle longitudinal direction and the vehicle width direction is increased, and torsional rigidity of the floor member 1 is also increased.

Thus, the vehicle body floor structure according to the embodiment provides increased rigidity and load dispersion against collision loads in the vehicle longitudinal direction (0-degree direction) or an offset direction input through the toe board during a front collision such as a full-lap collision or an offset collision. In addition, the vehicle body floor structure provides increased rigidity and load dispersion against collision loads and torsion loads in the 0-degree direction, the vehicle width direction (90-degree direction), or the 45-degree direction input through the right and left front pillars during a front collision or a roof crash due to rollover.

In addition, the vehicle body floor structure provides increased rigidity and load dispersion against collision loads in the 90-degree direction input to the right or left center pillar during a side collision. Further, the vehicle body floor structure provides increased rigidity and load dispersion against collision loads and torsion loads in the 0-degree direction or the 45-degree direction input through the rear panel during a front collision or a rear collision.

Thus, the vehicle body floor structure made of a fiber-reinforced resin composite material improves a load bearing capacity of the floor member 1, and efficiently disperses the load input during a collision, rollover, or the like, thereby reducing deformation of the vehicle body and mitigating damage.

3. Manufacturing Method

The following is an example of a vehicle body floor structure using the TFP method. Note that the method of manufacturing the vehicle body floor structure described below is merely one example, and the method of manufacturing the vehicle body floor structure according to the embodiment is not limited to the following example.

First, CFRP prepregs are laminated using, for example, a forming die or the like to form an intermediate base member in a semi-molten state that corresponds to the panel base member 10. At this time, the winding members 40 are attached to the positions of the coupling portions with other structural members designed in advance. In the panel base member 10 illustrated in FIG. 2, the winding members 40 are provided with an axial direction thereof aligned with a thickness direction of the intermediate base member. For example, in the process of laminating the prepregs, the main body 41 of the winding member 40 is inserted between the continuous fibers contained in the prepregs, and the base 43 of the winding member 40 is held down by the continuous fibers, thereby embedding part of the winding member 40 in the intermediate base member (see FIG. 3). The method for forming the intermediate base member is not limited.

Subsequently, the continuous fibers are alternately and repeatedly wound around two winding members 40 while sewing the continuous fibers onto the intermediate base member along predesigned positions, thereby disposing the continuous fibers in a band shape on the intermediate base member. The step of disposing band-shaped continuous fibers at a position corresponding to each of the continuous fiber-reinforced resin bands 20 is repeated. Subsequently, the band-shaped continuous fibers sewn onto the intermediate base member are impregnated with a matrix resin to preform continuous fiber-reinforced resin bands 20 (TFP method).

Subsequently, a resin or CFRP prepreg for forming the covering layer 23 is laminated so as to cover one or multiple band-shaped continuous fibers. Subsequently, the preformed continuous fiber-reinforced resin bands and covering layer are cured together with the intermediate base member to manufacture the floor member 1 having the continuous fiber-reinforced resin bands 20 at predetermined positions.

4. Modification

The winding member 40 in the embodiment, around which the continuous fibers constituting the continuous fiber-reinforced resin band 20 are wound, may be used to couple the floor member 1 to another structural member. In one example, the first winding member 40*a* and the second winding member 40*b*, and the third winding member 40*c* and the fourth winding member 40*d*, provided on the side E1 of the floor member 1 on the vehicle front side may be used as parts of a coupling structure that couples the floor member 1 to the toe board. Similarly, the fifth winding member 40*e* and the sixth winding member 40*f*, and the seventh winding member 40*g* and the eighth winding member 40*h*, provided on the side E2 of the floor member 1 on the vehicle rear side may be used as parts of a coupling structure that couples the floor member 1 to the rear panel.

The ninth winding member 40*i*, the 10th winding member 40*j*, and the 11th winding member 40*k* provided on the side E3 of the floor member 1 on the vehicle right side, on the front side, may be used as parts of a coupling structure that couples the floor member 1 to the right front pillar. The 12th winding member 401, the 13th winding member 40*m*, and the 14th winding member 40*n* provided on the side E3 of the floor member 1 on the vehicle right side, on the rear side, may be used as parts of a coupling structure that couples the floor member 1 to the right center pillar. Similarly, the 15th winding member 40*o*, the 16th winding member 40*p*, and the 17th winding member 40*q* provided on the side E4 of the floor member 1 on the vehicle left side, on the front side, may be used as parts of a coupling structure that couples the floor member 1 to the left front pillar. The 18th winding member 40*r*, the 19th winding member 40*s*, and the 20th winding member 40*t* provided on the side E4 of the floor member 1 on the vehicle left side, on the rear side, may be used as parts of a coupling structure that couples the floor member 1 to the left center pillar.

Figure 5:
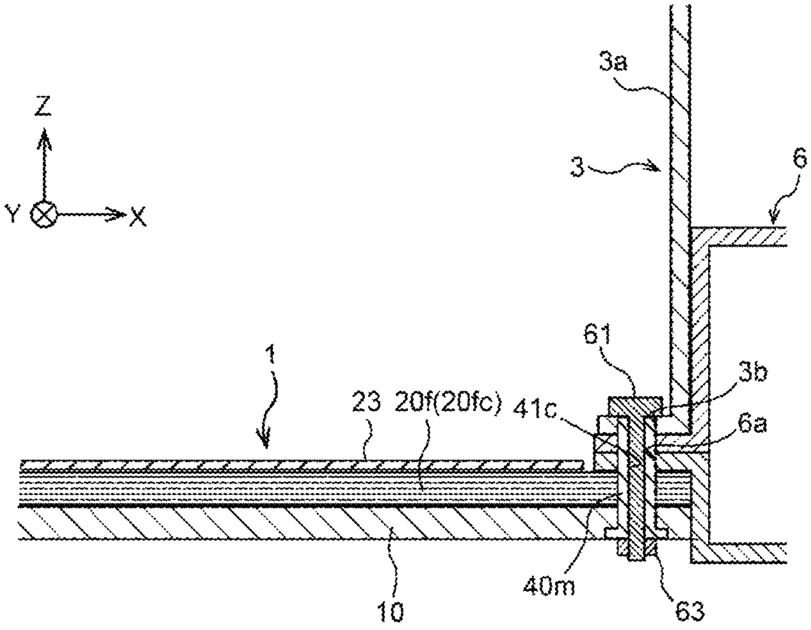
FIG. 5 is a cross-sectional view of a coupling portion between a floor member of the vehicle body floor structure according to the embodiment and a right center pillar.

FIG. 5 illustrates a cross-sectional view of a coupling portion between the floor member 1 and the right center pillar 3, taken along an extension direction of the first part 20*fc* of the second inclined band 20*f*.

The 13th winding member 40*m* penetrates the panel base member 10, with both axial ends exposed on both surfaces of the floor member 1. The 13th winding member 40*m* has a bolt hole 41*c* formed along a center axis thereof and openings at both axial ends of the 13th winding member 40*m*. A coupling bolt 61 as a coupling member for coupling the floor member 1 and the right center pillar 3 is inserted into the bolt hole 41*c*. The 13th winding member 40*m* around which the continuous fibers are wound is inserted into a hole 6*a* provided in the side sill 6 and a hole 3*b* provided in the right center pillar 3. Then, the floor member 1, the side sill 6, and the right center pillar 3 are fastened together using the coupling bolt 61 and a nut 63.

Although not illustrated in the figure, the winding members 40 are used to couple the floor member 1 to the toe board, the rear panel, the front pillars, and the center pillars, respectively.

Thus, the winding members 40 are used as parts of the coupling structures that couple the floor member 1 to other structural members, eliminating to provide separate components for positioning the other structural members to the floor member 1 and coupling members for coupling the floor member 1 to the other structural members. In addition, since the continuous fiber-reinforced resin bands 20 are firmly coupled to the other structural members, individually, the load is efficiently transmitted from the other structural members to the continuous fiber-reinforced resin bands 20 during a vehicle collision, rollover, or the like, and the load can be efficiently dispersed through the continuous fiber-reinforced resin bands 20.

For example, while joint strength of a known steel floor is ensured by spot welding or the like, it is difficult to use spot welding for a floor made of a fiber-reinforced resin composite material. For example, when an adhesive is used to bond the floor to other structural members, the floor may easily peel off from the other structural members when the load is applied. On the other hand, using the winding members as the parts of the coupling structures and fastening the winding members through the holes provided in the other structural members can ensure the joint strength between the floor member and the other structural members.

The preferred embodiment of the technology of the disclosure is described in detail above with reference to the accompanying drawings, but the technology of the disclosure is not limited to this example. It is apparent to those skilled in the art with common knowledge in the technical field of the disclosure that various variations and modifications may be conceived within the scope of the technical ideas described in the claims. Thus, it is acknowledged that those variations and modifications are also naturally included in the technical scope of the disclosure. Also, combination of the above-described embodiment and modification naturally falls within the technical scope of the disclosure.

For example, in the above-described embodiment, the continuous fiber-reinforced resin bands, each having predetermined two winding members at both ends, are exemplified, but the continuous fiber-reinforced resin bands in the technology of the disclosure are not limited to these examples. The continuous fiber-reinforced resin band may be provided with two winding members at both ends, other than the combination of the two winding members exemplified above. In addition, the planar pattern of the continuous fiber-reinforced resin bands is not limited to the example of the above-described embodiment, and may be designed as desired according to desired load transmission paths (load paths).

As described above, according to the technology of the disclosure, even when a vehicle body floor structure is formed using a fiber-reinforced resin composite material, it is possible to improve a load bearing capacity and ensure load transmission paths.

The invention claimed is:

1. A vehicle body floor structure made of a fiber-reinforced resin composite material, the vehicle body floor structure comprising:

a panel base member made of a fiber-reinforced resin composite material; and continuous fiber-reinforced resin bands, each of which is provided with a first coupling portion and a second coupling portion at respective ends and includes a continuous fiber sewn onto the panel base member, the first coupling portion and the second coupling portion being individually coupled to other structural members of the panel base member, wherein the continuous fiber-reinforced resin bands comprise:

at least one longitudinal band disposed along a vehicle longitudinal direction;

at least one widthwise band disposed along a vehicle width direction; and at least one inclined band disposed in a direction partially or entirely intersecting the vehicle longitudinal direction and the vehicle width direction, and the at least one inclined band comprises:

a first part disposed along the vehicle longitudinal direction or the vehicle width direction; and a second part bent from the first part and disposed in a direction intersecting the vehicle longitudinal direction and the vehicle width direction.

2. The vehicle body floor structure according to claim 1, further comprising:

a winding member provided to each of the first coupling portion and the second coupling portion, and around which the continuous fiber is wound, wherein the continuous fiber is wound around the winding member provided to each of the first coupling portion and the second coupling portion, and is disposed in such a way as to move back and forth between the first coupling portion and the second coupling portion multiple times.

3. The vehicle body floor structure according to claim 2, wherein the winding member is used in a coupling structure that couples the vehicle body floor structure to the other structural members.

* * * * *